US008296653B2

(12) United States Patent
Woolfe et al.

(10) Patent No.: US 8,296,653 B2
(45) Date of Patent: Oct. 23, 2012

(54) VARIABLE IMAGING ASSET UPLOAD AND VERIFICATION

(75) Inventors: Geoffrey John Woolfe, Umina Beach (AU); Philip Crane Rose, Sodus, NY (US)

(73) Assignee: Xerox Corporation, Norwalk, CT (US)

( * ) Notice: Subject to any disclaimer, the term of this patent is extended or adjusted under 35 U.S.C. 154(b) by 754 days.

(21) Appl. No.: 12/418,925

(22) Filed: Apr. 6, 2009

(65) Prior Publication Data
US 2010/0257446 A1 Oct. 7, 2010

(51) Int. Cl.
*G06F 17/00* (2006.01)

(52) U.S. Cl. ......... 715/274; 715/224; 715/225; 715/273

(58) Field of Classification Search .......... 715/224–225, 715/273–274
See application file for complete search history.

(56) References Cited

U.S. PATENT DOCUMENTS

| | | | | |
|---|---|---|---|---|
| 5,995,985 | A * | 11/1999 | Cai ............................ | 715/255 |
| 6,205,452 | B1 * | 3/2001 | Warmus et al. ............. | 715/246 |
| 6,684,369 | B1 * | 1/2004 | Bernardo et al. ............ | 715/205 |
| 6,947,959 | B1 * | 9/2005 | Gill ............................ | 715/202 |
| 7,383,499 | B2 * | 6/2008 | Kraft et al. .................. | 715/246 |
| 7,483,869 | B2 * | 1/2009 | Kumar ........................ | 706/47 |
| 2002/0049702 | A1 * | 4/2002 | Aizikowitz et al. .......... | 707/1 |
| 2004/0153971 | A1 * | 8/2004 | Taniwaki et al. ............ | 715/530 |
| 2005/0094207 | A1 * | 5/2005 | Lo et al. ..................... | 358/1.18 |
| 2005/0172224 | A1 * | 8/2005 | Kobashi et al. .............. | 715/517 |
| 2005/0174349 | A1 * | 8/2005 | Watson ...................... | 345/427 |
| 2005/0177676 | A1 * | 8/2005 | Karatal et al. ............... | 711/100 |
| 2005/0278475 | A1 * | 12/2005 | Karatal et al. ............... | 711/100 |
| 2006/0029125 | A1 * | 2/2006 | Kobashi et al. .............. | 375/222 |
| 2006/0103667 | A1 * | 5/2006 | Amit et al. .................. | 715/788 |
| 2006/0168514 | A1 * | 7/2006 | Tokunaga .................... | 715/513 |
| 2006/0274356 | A1 * | 12/2006 | Bellagamba et al. ........ | 358/1.15 |
| 2006/0282759 | A1 * | 12/2006 | Collins et al. ................ | 715/730 |
| 2007/0089053 | A1 * | 4/2007 | Uhlig et al. .................. | 715/513 |
| 2007/0240039 | A1 * | 10/2007 | Hosotsubo .................. | 715/517 |
| 2007/0244916 | A1 * | 10/2007 | Dreyer et al. ............... | 707/101 |
| 2008/0174824 | A1 * | 7/2008 | Yumoto et al. .............. | 358/1.17 |
| 2009/0177962 | A1 * | 7/2009 | Gusmorino et al. ......... | 715/243 |
| 2010/0157352 | A1 * | 6/2010 | Morales et al. .............. | 358/1.15 |
| 2012/0110440 | A1 * | 5/2012 | Rosner et al. ............... | 715/246 |

OTHER PUBLICATIONS

IEEE, IEEE 100 The Authoritative Dictionary of IEEE Standard Terms, 2000, IEEE Press, p. 872.*
Microsoft Corporation, Microsoft Computer Dictionary, 2002, Microsoft Press, Fifth Edition, pp. 302, 338, 690.*

* cited by examiner

*Primary Examiner* — Chau Nguyen
(74) *Attorney, Agent, or Firm* — Fay Sharpe LLP

(57) ABSTRACT

The subject embodiments relate to software tools providing a simplified way for print customers to easily perform pre-press checks and editing digital assets for use in a variable information print job. The digital assets are uploaded to the appropriate storage location in a digital asset repository hosted by the print system and checked for compatibility with variable data fields. Suggested editing is also available.

15 Claims, 8 Drawing Sheets

VARIABLE IMAGING ASSET UPLOAD AND VERIFICATION

FIELD

The present specification relates to variable information (VI) printing. Particular application is found in conjunction with large volume printing of personalized materials (e.g., such as personalized direct marketing materials), and the specification makes particular reference thereto. However, it is to be appreciated that aspects of the presently disclosed subject matter are also amenable to other like applications.

BACKGROUND

VI printing commonly involves a relatively large volume multi-document or multi-piece print job were certain information or data is varied from document to document or from piece to piece. That is to say, a VI print job will commonly include certain information or data (i.e., text, images and/or graphic content) that is static or the same across all the documents or pieces in the job and other information or data (again, text, images and/or graphic content) that is variable or that changes from document to document.

The use of VI printing, e.g., to produce personalized direct marketing materials, is a rapidly growing application in the digital printing field. Commonly, the printed materials created for such applications are generally in color and typically include variable images, text and/or graphic components that are personalized to suit the intended recipient. In accordance with many conventional approaches, the VI document is usually described by a layout and/or template and a set of rules that together describe how to use and/or present the variable information or data in the document. The variable images, text and/or graphic components (referred to generally herein as the digital assets) which are used to create the documents are often supplied to a printer by a customer or designer or other suitable proxy that developed the conceptual design of the direct marketing documents. Typically, the use of the various digital assets to build personalized VI printed documents is controlled by a data file, also typically supplied by the customer. Commercially available VI printing applications (e.g., such as Exstream Dialog, XMPIE® PERSONAL EFFECT® and XEROX's® VIPP) are commonly used to create the layout templates and rules.

In other words, the aforementioned commercially available software applications are commonly used to define and/or assemble the VI documents. Such applications generally define the VI documents using a layout and/or template and a set of rules that together describe how to use and/or present the variable data in the document. The conceptual design of the document often originates with the customer, e.g., via their marketing department, an outside advertising agency or other suitable proxy. In any event, the customer or their proxy is usually responsible for providing to the printer the digital assets used to create the documents. The mapping of digital assets into the layout and/or template to build personalized VI printed documents is generally controlled by a data file that is also typically supplied to the printer by the customer.

Often, in conventional workflows, when customers send new digital assets to a printer, the printer must undertake certain technical, aesthetic and/or other pre-press activities to ensure that the new assets will work correctly with the VI layouts and/or rules. For example, in the case of images, this typically involves checking image resolution (e.g., the number of pixels), image orientation, cropping for aesthetic and/or layout purposes, color correction, etc. Text assets may have to be edited to allow them to fit into a pre-defined space or in order for them to wrap or flow as desired. In many cases, before the VI print job can be suitably executed, the printer and the customer have to exchange communications one or more times to correct problems with the digital assets. Generally speaking, the time spent by a pre-press professional to communicate with the customer and/or to correct the digital assets is expensive to the printer and can result in delays in printing the job. Furthermore, aesthetic decisions made by the printer's pre-press staff may not be acceptable to the customer or other agent requesting the job, which can lead to customer dissatisfaction and additional delay and/or cost. Clearly, it would be desirable to have a simple, easy to use method, tool or other application that will allow non-print savvy customers and/or their designated proxies to upload digital assets to the printer in a way which ensures that: i) the assets are free of quality problems, ii) the assets are appropriate for their intended use; and/or, iii) the assets and/or finished product are aesthetically pleasing.

Accordingly, a new and improved system and/or method is disclosed that overcomes the above-referenced problems and others.

BRIEF SUMMARY

The subject embodiments relate to software tools providing a simplified way for print customers to easily perform pre-press checks and edit digital assets for use in a variable information print job. The digital assets are uploaded to an appropriate storage location in a digital asset repository hosted by the print system. The tool/application could be configured as a client application hosted from the printer's server or as a web application.

A secure login is provided for the customer. The login provides access to certain layout and rules information, created and controlled by the printer, which pertains to variable information print jobs belonging to the customer. The layouts and the rules information are used to construct a preview of the document on the customer's monitor. Placeholders for variable data content are clearly marked on the preview. The customer is then presented with a user interface that allows him/her to assemble one or more digital asset files from the local file system into a container (e.g. a folder) for subsequent uploading to the printer's digital asset collection. The selected files belong to a common group that will perform a similar function within the document. The customer is then prompted to select one or more placeholders in the variable information layout, corresponding to the location in the document for which the new assets may be used. The application then checks each of the new digital assets against the rules and definitions associated with the placeholder. If the application finds any incompatible, i.e., non-confirming, new assets, the customer will be given the opportunity to edit them to bring them into compliance or to remove them from the container to be uploaded. When all new digital assets in the container are conforming, the container is uploaded to the printer site and stored in their appropriate location in the printer's digital asset archive. The print job can then be properly run.

One embodiment comprises a method of pre-press checking and editing digital assets by a print customer for use in a variable information print job comprising; organizing the user's digital assets into subgroups of similar content, downloading a virtual template to a user site remote from the printer site, selecting digital assets from a subgroup and placing the selection onto the virtual layout template at the user site; and, uploading the selected assets to the printing site.

One embodiment includes a method for uploading and verifying by a print customer selected digital assets for use in the variable information print job in a print system including a processor, comprising: providing a user a first interface, said first interface allowing a user to select digital assets designated for uploading to a repository of the print system, organizing the selected assets into groups of similar content, providing a user a second interface, the second interface allowing the user to select a document template from a template repository, the template including one or more variable data fields designated to receive selected assets, checking the compatibility of the selected assets with each variable data field in the selected document template, and, advising the customer of an incompatibility of the selected assets with each variable data field.

Numerous advantages and benefits of the subject matter disclosed herein will become apparent to those of ordinary skill in the art upon reading and understanding the present specification.

BRIEF DESCRIPTION OF THE DRAWINGS

The presently disclosed subject matter may take form in various components and arrangements of components, and in various steps and arrangements of steps. The drawings are only for purposes of illustrating example embodiments and are not to be construed as limiting. Further, it is to be appreciated that the drawings are not to scale.

DETAILED DESCRIPTION

Figure 1:
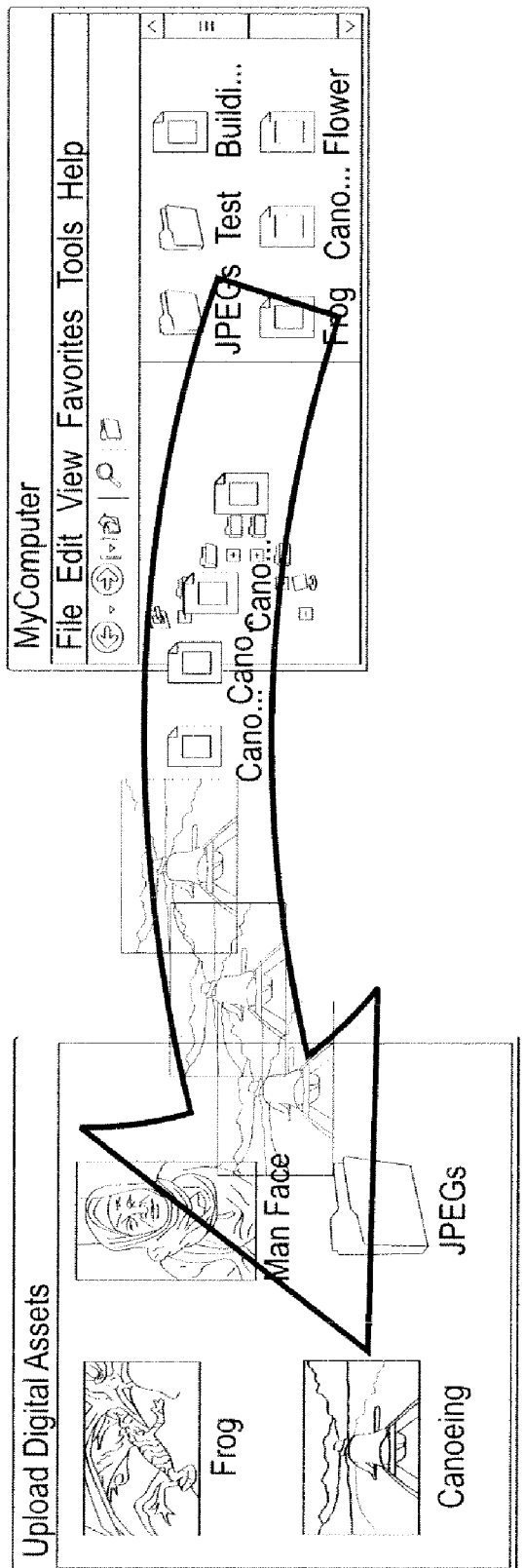
FIG. 1 is a pictorial representation of an exemplary manner by which a customer optionally selects digital assets for uploading to a printer in accordance with aspects of the presently disclosed subject matter.

For clarity and simplicity, the present specification shall refer to structural and/or functional elements, entities and/or facilities, relevant standards, protocols and/or services, and other components and features that are commonly known in the VI digital printing arts without further detailed explanation as to their configuration or operation except to the extent they have been modified or altered in accordance with and/or to accommodate the embodiment(s) presented herein.

Generally, the presently disclosed subject matter addresses the problems described and/or alluded to in the Background section of the present specification by providing a method and/or system, e.g., that allows customers or their designated proxies to control the editing, adjustment and/or uploading of new digital assets to a selected printer. In short, the presently disclosed subject matter is directed to an application (e.g., which is controlled by the appropriate VI document layout/template and/or rules) that identifies potential problems with digital assets and allows them to be remotely corrected by the customer prior to uploading the assets to the printer. Suitably, the application includes a set of intuitive, easy to use editing tools that the customer may selectively use without having any specialized digital imaging or VI printing knowledge. As can be appreciated, performing pre-flight and/or pre-press checks and/or editing of digital assets for VI print jobs can be a significant burden for a printer. Accordingly, one objective of the presently disclosed subject matter is to reduce or eliminate that burden by shifting the responsibility for these functions back to the customer. However, this can be achieved advantageously in a manner suitable to the customer only if the technical complexity of the task is reduced to a level where the customer can perform the job easily and efficiently. Therefore, suitable tools and/or techniques are described herein that provide this simplification.

More specifically, according to one suitable embodiment, a software tool is disclosed that provides a simplified way for print customers or their proxies to easily perform pre-press checks and/or editing of digital assets for use in a VI print job. Suitably, the software tool also allows new digital assets to be uploaded by a customer to an appropriate storage location, e.g., in a digital asset repository hosted by the printer. Optionally, the software tool is configured as a client application and/or a web application hosted from a suitable server of the printer.

In one exemplary embodiment, the application provides a secure login for the customer. Accordingly, by employing the secure login a customer is provided access to certain layout and rules information, e.g., created and/or controlled by the printer, which pertains to VI printing jobs belonging to the customer. Suitably, the layouts and rules information is used to construct a preview of the document on the customer's monitor or display, and placeholders for variable data content are optionally clearly marked on the preview. The customer is then presented with a graphic user interface (GUI) or other suitable user interface that allows the user to assemble one or more digital asset files (e.g., from their local file system) into a folder or other like container for subsequent uploading to the printer's digital asset collection. In practice, the selected files will typically all belong to a common group that will perform a similar function within the document. Next, the customer is suitably prompted to select one or more placeholders in the VI layout, corresponding to the location in the document for which the new assets may be used. In response to the user's selection, the software tool or application then checks each of the new digital assets against the rules and/or definitions associated with the selected placeholder(s). If the software tool or application finds any non-conforming new assets, then the customer is optionally given the opportunity to edit them to bring them into compliance or to remove them from the container being uploaded. Suitably, when all the new digital assets in the container are conforming, the container is uploaded to the printer's site and stored, e.g., in an appropriate location in the printer's digital asset archive.

Figure 7:
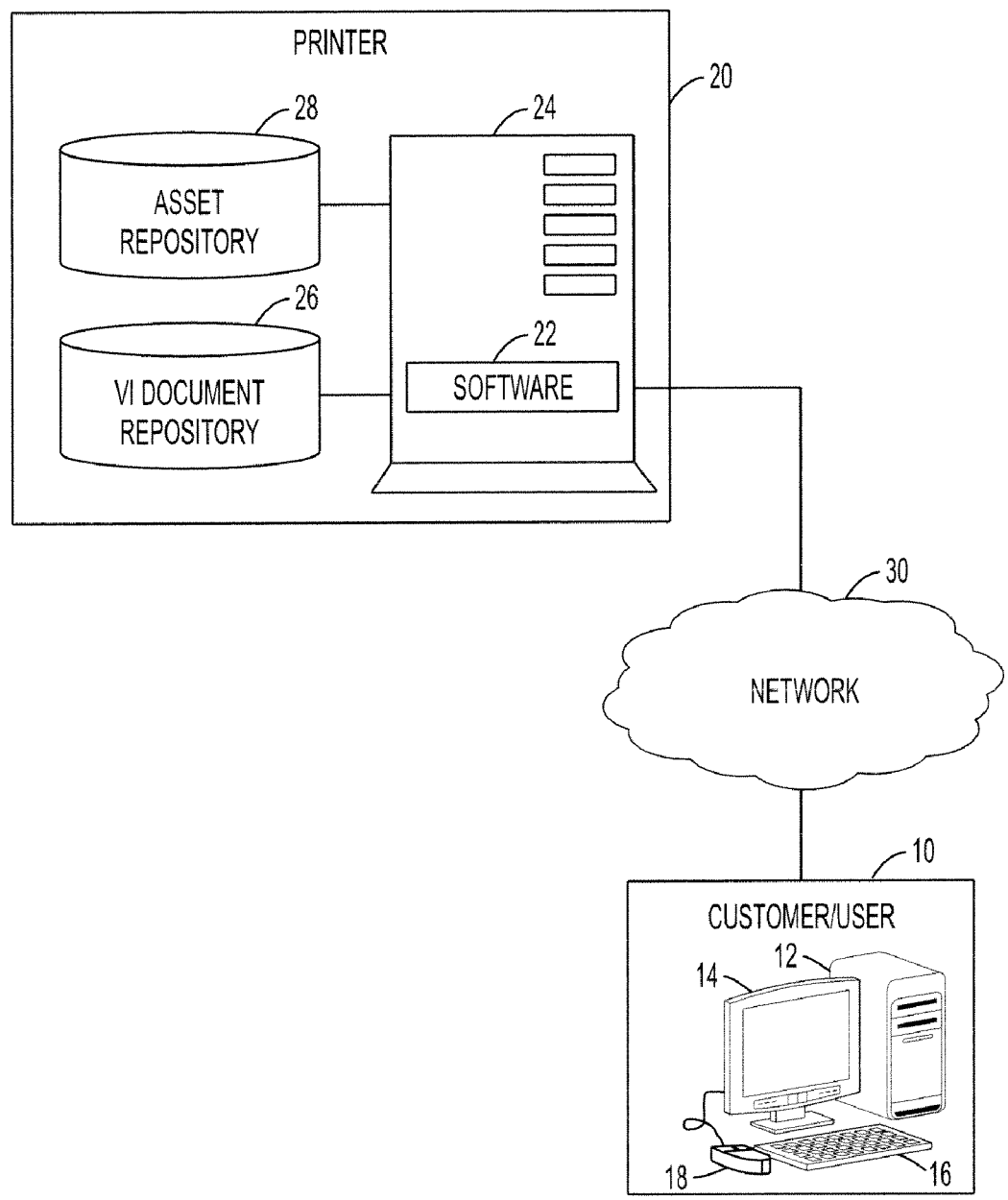
FIG. 7 is diagrammatic illustration showing an exemplary system suitable for practicing aspects of the presently disclosed subject matter.

With particular reference to FIG. 7 at this time, it shall now be illustrated how a suitable embodiment of the presently disclosed software tool or application operates in practice by reference to an exemplary scenario in which a print customer or user 10 wants to engage in, e.g., a personalized direct marketing campaign. For purposes of this example, let us assume that it is the intent of this campaign for the user 10 to regularly analyze the purchase data of the user's patrons and follow up with personalized marketing materials sent to the patrons' homes. The materials sent to each patron, e.g., will showcase one or more items that the user's analysis suggests that each respective patron is likely to purchase in the future. For example, if patron A previously purchased item X, their personalized marketing material might suggest that they also purchase item Y. On the other hand, if patron B previously purchase item M, their personalized marketing material might suggest that they also purchase item N.

In any event, the personalized marketing materials are suitably created by a VI document that may contain one or more variable fields including text, images and/or graphic content. In practice, the user 10 may work with a selected printer 20 to develop a VI printing solution that will meet their specifications and/or demands. For example, the user 10 or their designated proxy works with the printer 20 to build a document layout template and associated rules to be employed by the user 10. Suitably, the document layout template may include both fixed components or static content and one or more fields or placeholders for variable information or data. The variable information to be used in the document, e.g., may include: i) images of products (i.e., bitmaps), ii) maps to the closest stores (i.e., vector graphics), iii) text descriptions and prices of products (i.e., text only); and/or, iv) attention grabbing text banner messages (i.e., text and associated font information). Suitably, the placeholders may be of a fixed size or allow a certain range of sizes to be used for each field. Moreover, the entire marketing campaign may involve a number of different VI documents, each with its own layout template and/or associated rules.

When the time comes, in order to complete a desired VI print job, the printer 20 will ultimately have to have the content or digital assets with which to populate the document templates. Suitably, these digital assets are provided by the customer or user 10. In order to ensure that the digital assets provided by the user 10 satisfy the high quality demands and/or specification of the respective VI document being printed or otherwise produced, the user 10 and/or printer 20 suitably make use of the software tool or application described herein (indicated generally by reference numeral 22 in FIG. 7).

In the illustrated embodiment, the software 22 functions as a client-server application hosted by the printer 20 on a suitable server 24, or alternately, as a web browser applet downloaded by the user 10 from the printer 20. As shown, the user 10 optionally employs a client computer 12 (e.g., a general purpose desktop or laptop or other like computer provisioned with a monitor or display 14, a keyboard 16, a mouse 18 and/or any other conventional adjunct equipment) to remotely access the software or application 22 and/or to remotely upload desired digital assets to the printer 20, e.g., over a suitable network 30 (such as the Internet or other like public or private network) to which both the client computer 12 and the server 24 are operatively connected in the usual manner for the exchange of data and/or communications therebetween.

Also shown in FIG. 7 is a VI document repository 26 that is suitably maintained by the printer 20 so as to be accessible to the software or application 22 supported on and/or by the server 24. In the illustrated embodiment, the pre-defined document layout templates and the associated rules therefor are stored and/or otherwise maintained in the VI document repository 26 by the printer 20 for use by the customer or user 10 for which they were designed. As indicated above, the user 10 may optionally have one or more document template layouts and corresponding rules maintained in the VI document repository 26.

In addition to the VI document repository 26, a digital asset repository 28 is also suitably maintained by the printer 20 so as to be accessible to the software or application 22 supported on and/or by the server 24. The digital asset repository 28 is employed by the printer 20 to store and/or maintain the various digital assets of the user 10, e.g., received from the customer or user 10 upon their ultimate upload.

Figure 8:
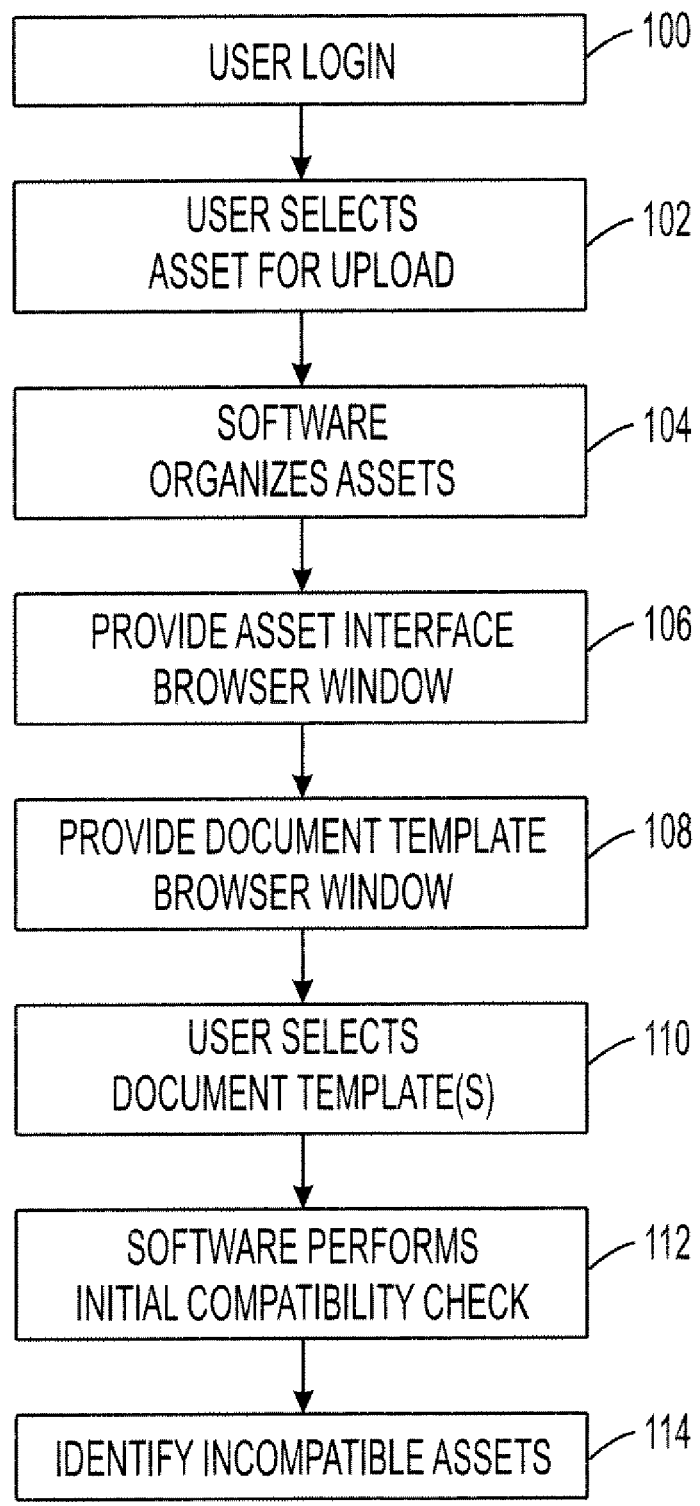
FIG. 8 is a flow chart showing an exemplary process suitable for practicing aspects of the presently disclosed subject matter.

Referring to FIG. 8, there is shown an exemplary process by which operation of the software or application 22 is initiated by the user 10. In particular, at step 100 when the user 10 accesses the software 22 or the application is otherwise started, a secure login screen or other prompt is optionally provided to the user 10, e.g., output on the display 14. Suitably, the user 10 employs the keyboard 16 and/or mouse 18 to enter appropriate login credentials, e.g., a username or ID and password. In this manner, the identity of the user 10 is determined and/or verified, thereby granting the user 10 access to the application 22 and/or the other resources (i.e., document templates, digital assets, etc.) maintained for the user 10 by the printer 20.

After the user 10 has logged-in, the user 10 is provided at step 102 the opportunity to select one or more digital assets that they want to provide to the printer 20, e.g., by depositing the selected assets in a folder or other suitable container. For example, these assets might include images, text or graphics, or even other folders of assets. Suitably, the user 10 is provided with a simple interface (e.g., such as a "drag and drop" interface) to copy the desired digital assets from their local file system (e.g., on the computer 12) into the folder or container for upload. Such a process is illustrated graphically, for example, in FIG. 1.

In the exemplary embodiment shown, at step 104, the application 22 then organizes the asset files into sub-groups of similar content. For example, this may includes grouping images, text and graphics separately. Optionally, the asset types or content are identified by their file name extensions or by some other appropriate analysis of the assets.

Figure 2:
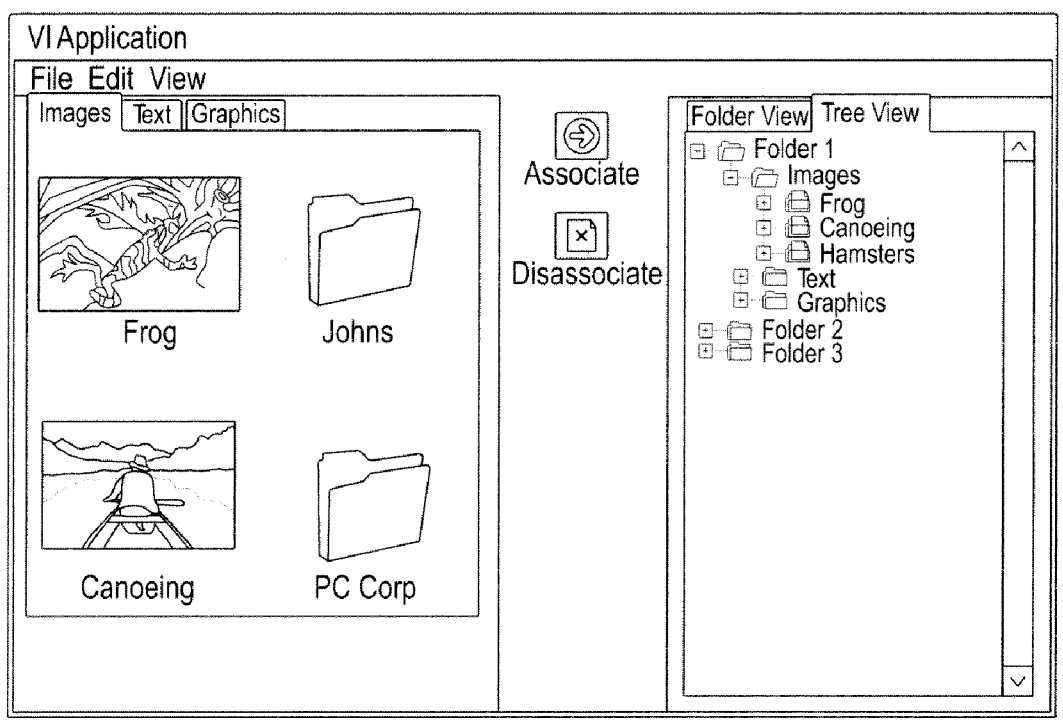
FIG. 2 is a pictorial representation of an exemplary browser window and/or interface displaying an organization of the new digital assets selected for uploading in accordance with aspects of the presently disclosed subject matter.

In either case, after the sorting step 104, the organized assets are suitably presented in step 106 to the user 10, e.g., using a browser type interface or window output on the display 14. Optionally, this interface would enable the customer or user 10 to view important attributes of each of the digital assets, e.g., by selecting or highlighting or otherwise indicating the asset of interest to the user 10. Examples of such attributes might include number of pixels, image size, image color encoding, capture date and time, exposure settings, etc. for images and character/word count, font, highlighting, etc. for text. Attributes of graphics objects are also optionally viewable. FIG. 2 shows a suitable example of this interface. In one suitable embodiment, the asset interface browser window also provides access to editing applications to allow the customer or user 10 to make last minute changes to his digital assets. For example, via a designated selection of the asset desired (e.g., double clicking on the asset in question with the mouse 18), the asset is optionally opened in a corresponding editing application appropriate for the asset.

Figure 3:
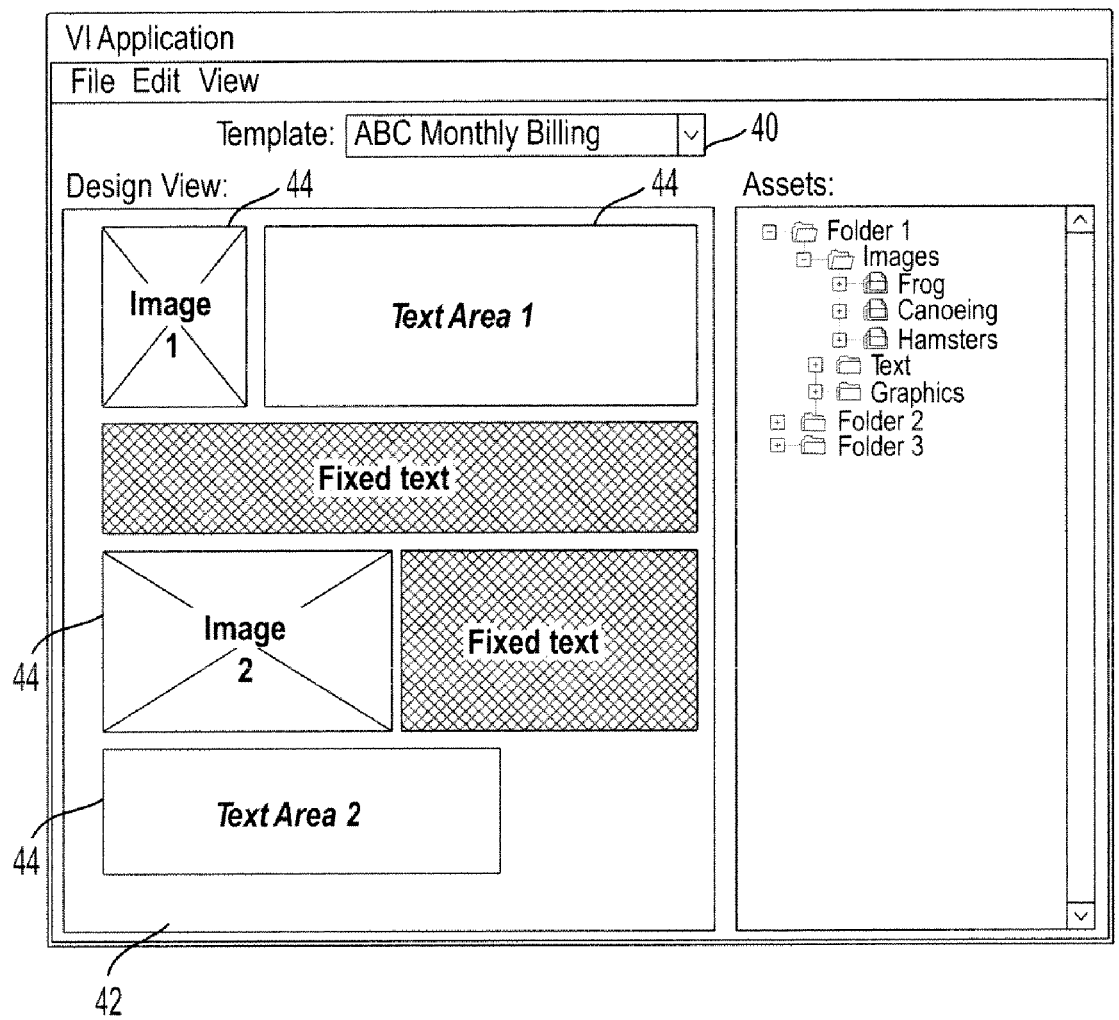
FIG. 3 is a pictorial representation of an exemplary browser window and/or interface displaying a selected document template layout in accordance with aspects of the presently disclosed subject matter.

Having organized the assets, at step 108, the customer or user 10 is now provided with a document template interface or browser window (e.g., output on the display 14) that lists and/or shows the pre-designed VI documents that the printer 20 can print for the customer or user 10. A suitable example of the document template browser interface is shown in FIG. 3. In particular, the software or application 22 accesses the document layouts/templates maintained by the printer 20 for the user 10 from the document template repository 26, and these document layouts/templates are included in the document template browser interface.

At step 110, the user 10 selects the VI document(s) with which the new digital assets selected for upload will be used. Suitably, the user 10 may select any one or more of documents displayed and/or listed in the browser interface. As shown in FIG. 3, the document template browser window may include a drop-down menu 40 from which the user 10 may selected one or more desired templates. Suitably, the layout of the actively selected or currently highlighted document template is shown in panel 42. Alternately, the document template browser window may display a tabbed arrangement of document templates arranged with one layout view or panel one on top of the other, or a tiled arrangement may be employed that shows all the template layouts simultaneously in the document template browser interface.

Suitably, as described above, each document has an associated document layout template and associated rules for its use. In the template layout shown in FIG. 3, for example, the document includes a plurality of fields 44 which are arranged according to the illustrated layout. In this example, there is one field indicated by the "Image 1" placeholder that is designated for receiving a first variable data element, i.e., an image; there is another field indicated by the "Text Area 1" placeholder that is designated for receiving a second variable data element, i.e., text; there are static or fixed data fields indicated generally by the "Fixed text" labels (of course, in practice, the static or fixed fields may optionally contain image or graphic data); there is another field indicated by the "Image 2" placeholder that is designated for receiving a third variable data element, i.e., another image; and, there is another field indicated by the "Text Area 2" placeholder that is designated for receiving a fourth variable data element, i.e., text. Of course, in practice, the document layout may include any arrangement of variable data fields and/or static data content.

In any event, each document template is also accompanied by a set of rules or specifications that the assets have to comply with if they are going to be populated in particular fields. For example, image assets may have to be a particular size or within a particular size range, or have an appropriate resolution if they are to adequately fill a specific variable data field. Likewise, text assets may also have to be the appropriate size and/or have a desirable wrapping arrangement to appropriately fill the variable data field for which they are destined. Accordingly, the rules define the various parameters with which assets have to comply if they are going to be adequately used in particular variable data fields. Depending on the type of variable data field to which a rule applies, the defined parameters may optionally include, e.g., the type or category of asset which may be used in a field (i.e., image, text or graphic), the asset size, image resolution, font characteristics, word wrapping and/or hyphenation rules, color characteristics, orientation, etc.

Having selected the document layout templates with which the digital assets are to be used, the application 22 now optionally performs an initial compatibility check at step 112. Suitably, the application checks all the assets selected for upload to find any that do not fit the specifications or satisfy the rules associated with at least one the placeholders or fields in any of the selected document templates. As can be appreciated, such assets could not be appropriately used in any of the document templates, and accordingly, the user 10 is provided an opportunity to either remove them, edit them or to replace them.

Figure 4:
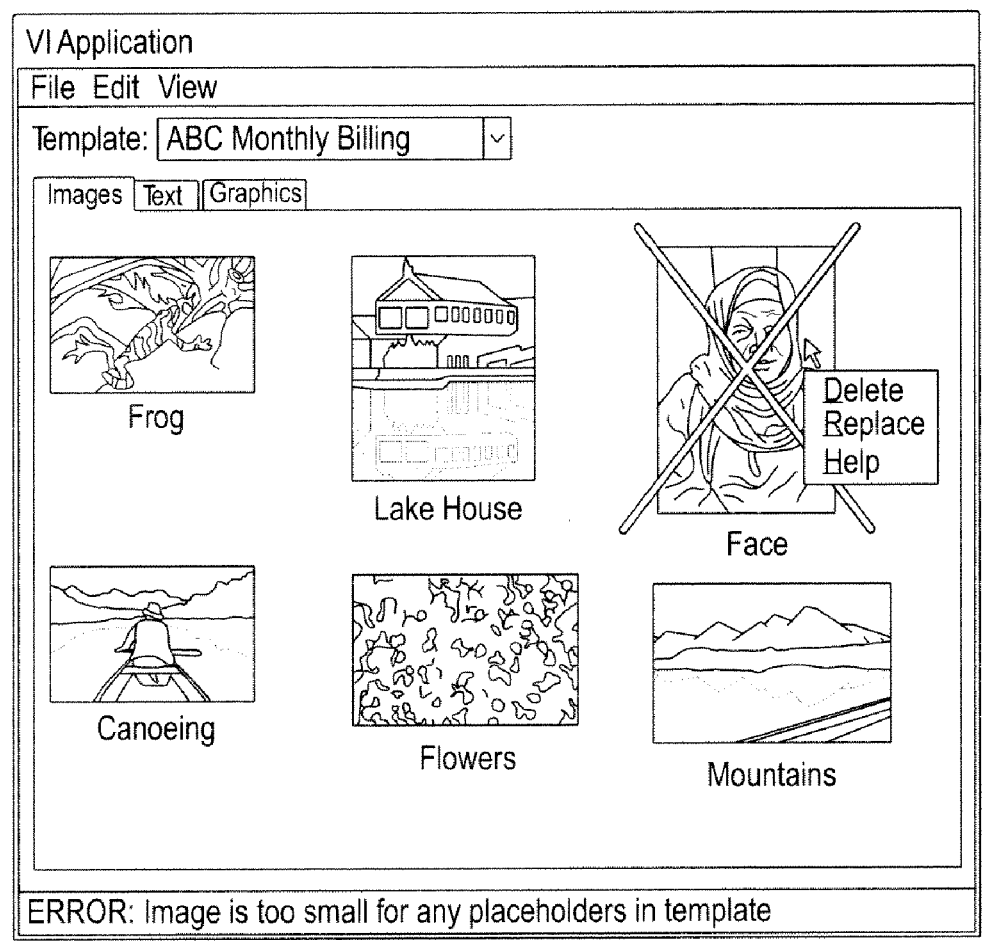
FIG. 4 is a pictorial representation of an exemplary browser window and/or interface in accordance with aspects of the presently disclosed subject matter, said window/interface showing a particular digital asset indicated as being incompatible with any selected document template.

In particular, at step 114, incompatible assets are identified, e.g., in an appropriate interface and/or browser window output on the display 14. For example, FIG. 4 illustrates a suitable interface or browser window including an asset which has been indicated as incompatible by displaying an "X" over the affected asset. Suitably, by performing a designated selection on the asset in question (e.g., by right clicking on the asset with the mouse 18 or taking an otherwise designated action), the user 10 is presented several options, including, e.g., an explanation of why the asset is unsuitable (available by selecting the "Help" option), the ability to delete the asset from the upload (available by selecting the "Delete" option), or the ability to replace the asset with a new one (available by selecting the "Replace" option).

Optionally, after completing the initial compatibility check as described above, the software 22 may be employed by the user 10 prior to the ultimate uploading of the asset in order to: i) ensure the particular compatibility between specific document template fields and specific assets intended to be used in those specific fields; and/or, ii) edit sufficiently compatible assets to fully comply with the specifications or rules of a specific desired document template field in which the asset is to be populated. In one suitable embodiment, the template browser window or interface (e.g., provided in step 106) and the digital asset browser window or interface (e.g., provided in step 108) are employed by the user 10 for this purpose and are designed and/or otherwise arranged to operate in a linked fashion with one another. This means that actions performed in one window or interface will affect the information displayed in the other window or interface. Alternately, as shown in FIGS. 5 and 6, a separate or additional combined browser window or interface may be supplied to the user 10 (i.e., output on the display 18) that includes pertinent information from both the aforementioned browser windows or interfaces.

Figure 5:
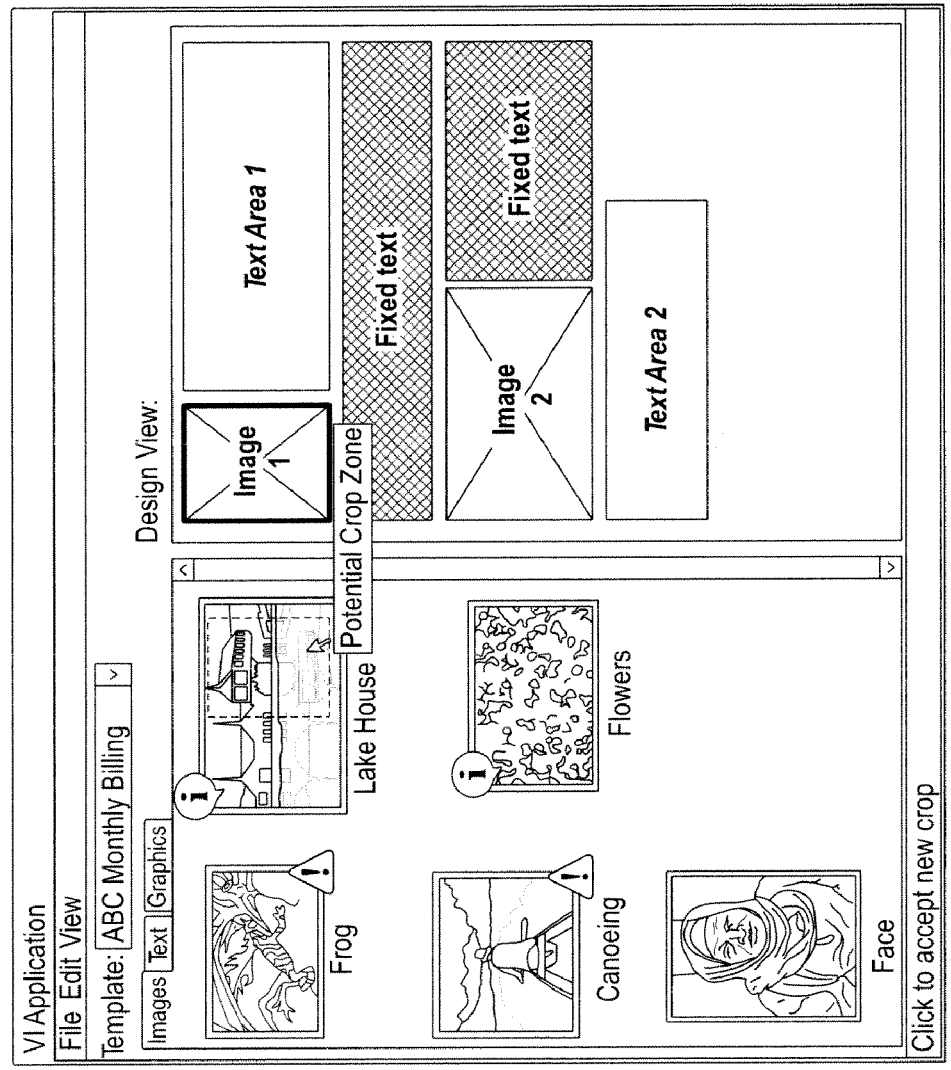
FIG. 5 is a pictorial representation of an exemplary browser window and/or interface in accordance with aspects of the presently disclosed subject matter, said window/interface showing the compatibility of displayed digital assets with a particular document template field represented by a selected placeholder in the displayed layout.
Figure 6:
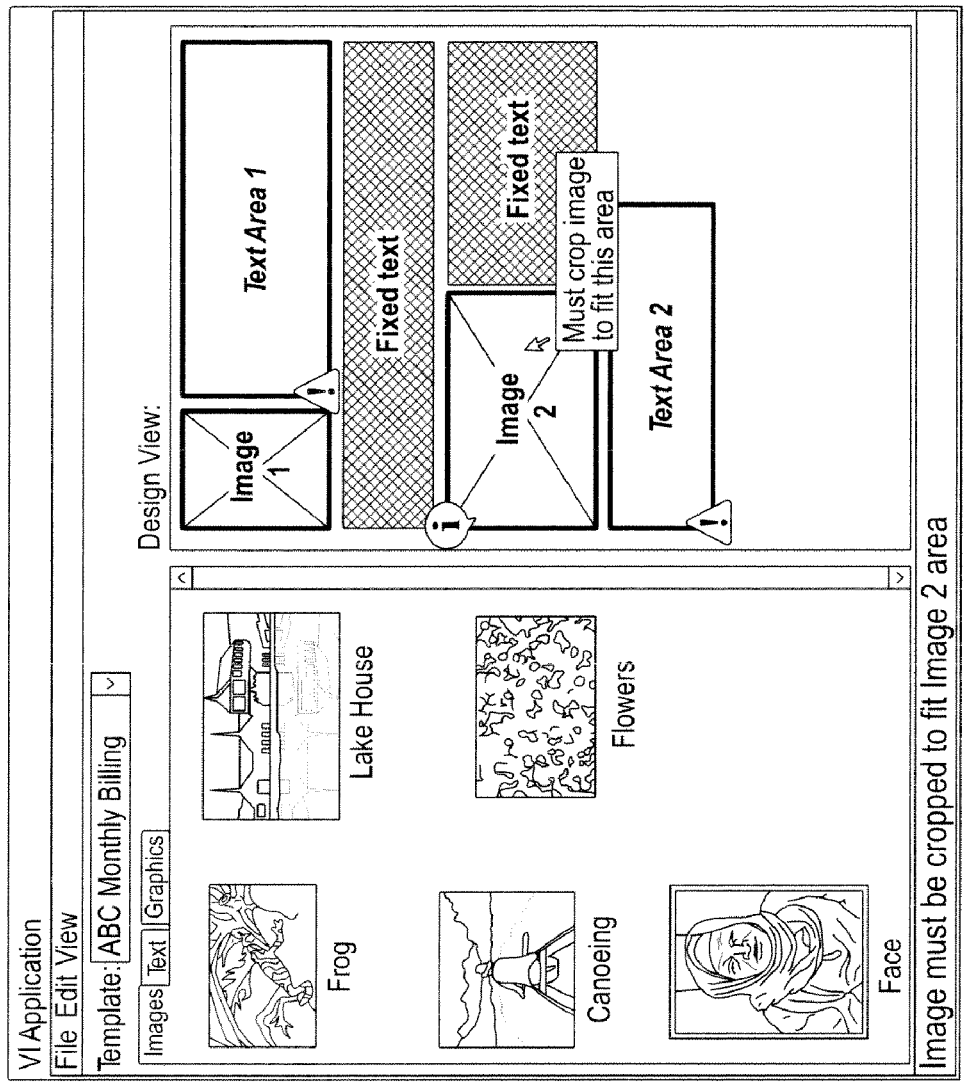
FIG. 6 is a pictorial representation of an exemplary browser window and/or interface in accordance with aspects of the presently disclosed subject matter, said window/interface showing the compatibility of document template fields represented by placeholders in the displayed layout with a particular selected displayed digital asset.

As can be seen from the example browser window or interface illustrated in FIGS. 5 and 6, the combined interface or browser window displays the organized digital assets by category, e.g., in tabbed fashion on the left pane, and a selected document template layout is displayed in the right pane. Suitably, the pull down menu 40 is optionally employed by the user 10 to chose which document template layout is displayed. Alternately, one or more of the document templates previously selected by the user 10 (e.g., in step 110) may be arranged in a tabbed or tiled format. Likewise, the digital assets may also be displayed in a tiled format or selectively displayed in accordance with an optional pull-down menu.

With reference to FIG. 5 and 6, it will now be described by way of example how the interactive browser window and/or interface can be used to check and/or edit the digital assets prior to uploading them to the printer 20. Suitably, the user 10 may selectively employ either or both or two methods to perform compatibility checking of specific assets with specific document template fields. In a first method, the user 10 suitably selects a particular placeholder of interest from the document template layout displayed on the appropriate interface or browser window; and in a second method, the user 10 suitably selects a particular asset from the assets displayed on the appropriate interface or browser window.

According to the aforementioned first method, the user 10 optionally selects (e.g., using the mouse 18) a particular placeholder of interest (i.e., representing a particular field for which asset compatibility is desired to be tested) in one of the displayed document template layouts. In response, the selected placeholder is optionally highlighted. For example, as shown in FIG. 5, the "Image 1" placeholder has been selected by the user 10. In addition, any other placeholders that represent fields having the same parameter specifications and/or rules as the field representing the selected placeholder may also optionally be highlighted. Suitably, if the document template layouts are arranged in tabbed fashion, any hidden template layout having a highlighted placeholder, would also have its corresponding tab highlighted to so notify the user 10 of this fact.

In any event, the action of selecting a particular placeholder prompts or otherwise instructs the software or application 22 to test all the digital assets awaiting upload for compliance with the rules designated for the field represented by the selected placeholder. That is to say, the application 22 compares the particular parameters of each digital asset against the rules and/or specification defined for the particular field represented by the placeholder. As a result of this testing, the application 22 sorts and/or otherwise divides the digital assets optionally into three categories, namely, i) digital assets that are fully usable in the placeholder location without modification (i.e., those digital assets having parameters that fully comply with and/or satisfy the rules associated with the corresponding field);

ii) digital assets that require minor modification to be used in the placeholder location (i.e., those digital assets having parameters that are outside those defined by the rules associated with the corresponding field, but which could be readily edited to otherwise fully comply with and/or satisfy the rules associated with the corresponding field); and, iii) digital assets that cannot be used in the placeholder location (i.e., those digital assets having parameters that are outside those defined by the rules associated with the corresponding field, and which cannot be readily edited to otherwise fully comply with and/or satisfy the rules associated with the corresponding field).

Suitably, each digital asset is then identified by the category into which it falls, e.g., using borders of different colors around the displayed assets on the respective interactive browser window or interface or using any other suitable method to distinguish the respective category of each asset. For example, as shown in FIG. 5, the assets marked with an "!" fall into the category of "digital assets that cannot be used in the selected placeholder location;" while the assets marked with an "i" fall into the category of "digital assets that require minor modification to be used in the selected placeholder location;" and the unmarked asset falls into the category of "digital assets that are fully usable in the selected placeholder location without modification."

According to the aforementioned second method, the user 10 optionally selects (e.g., using the mouse 18) a particular digital asset of interest. In response, the selected asset is optionally highlighted. For example, as shown in FIG. 6, the digital image asset label "Face" has been selected by the user 10. However, in practice of course, the user 10 may select any desired digital asset from any asset type represented in the respective interactive browser window or interface.

In any event, the action of selecting a particular asset prompts or otherwise instructs the software or application 22 to test the selected asset for compliance with the rules designated for each of the fields represented by a placeholder in the document template layouts available in the respective interactive browser window or interface. That is to say, the application 22 compares the particular parameters of the selected digital asset against the rules and/or specification defined for each particular field represented by the corresponding placeholder—in short, the application 22 decides which placeholders the selected asset may suitably replace in the document layout. As a result of this testing, the application 22 sorts and/or otherwise divides the corresponding placeholders optionally into three categories, namely, i) those in which the asset can be used without modification;

ii) those in which a slightly modified version of the asset could be used; and, iii) those that could not possibly use the asset.

Suitably, each placeholder is then identified by the category into which it falls, e.g., using borders of different colors around the displayed placeholders on the respective interactive browser window or interface or using any other suitable method to distinguish the respective category of each placeholder. For example, as shown in FIG. 6, the placeholders marked with an "!" fall into the category of "not compatible with the selected digital asset;" while the placeholder marked with an "i" falls into the category of "could be compatible with a slightly modified version of the selected digital asset;" and the unmarked placeholder falls into the category of "fully compatible with the selected digital asset." Of course, suitably, if the document template layouts are arranged in tabbed fashion, any hidden template layout having a highlighted or otherwise marked placeholder, would also have its corresponding tab highlighted to so notify the user 10 of this fact.

In one optional embodiment, if a digital asset is found to be compatible with a particular placeholder upon appropriate editing, then the application 22 suitably informs the user 10 of the type of editing that will bring the asset into compliance and optionally provide a simple interface by which the editing can be accomplished. For example, as shown in FIG. 5, the digital asset labeled "Lake House" has been deemed suitable for the field represented by the placeholder "Image 1." However, in order to comply with the size restrictions or rules defined for this field, the asset has to be cropped. The application 22 optionally indicates this editing option to the user 10 by placing a constrained cropping marquee over the displayed asset thereby delineating a potential crop zone that will bring the asset into compliance Accordingly, the user 10 may selectively position the marquee as desired with respect to the image asset and choose the suggested crop option to bring the asset into compliance with the rules for the field represented by the corresponding placeholder. Suitably, other types of editing suggestions and/or options that the application 22 may provide include without limitation:

resampling of images to increase or decrease resolution (however, only modest increases in image resolution may be permitted to avoid quality artifacts);

simple color and/or tone adjustments of images (e.g., such as brightness, contrast, colorfulness, color balance, etc.); and, simple text editing of text assets to enable them to fit and/or wrap as desired.

Finally, once the user 10 is satisfied that the assets are in order, the uploading of the assets to the printer 20 may be completed. Consequently, when the assets are received by the printer 20, they are suitably stored in the asset repository 28.

As persons of ordinary skill in the art will appreciate from the present specification, a significant advantage of the software tool 22 and/or the present approach is that it allows customers (such as the user 10), rather than printers (such as the printer 20), to be responsible for editing and/or adjustment of digital assets used in VI printing applications. This has the combined benefit of saving the printer 20 the expensive responsibility for pre-press correction of digital assets, but also having the pre-press corrections performed by the customer/user 10—i.e., the one who has the best knowledge of how those assets should ultimately appear in the printed documents. Notably, this is achieved by providing simple tools that assist the customer/user 10 in determining what should be done and by making the interfaces to those tools appropriate for the skill levels of typical customers that may not be highly knowledgeable about digital or VI printing practices.

In any event, it is to be appreciated that in connection with the particular example(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. In any event, it will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of pre-press checking and editing digital assets by a print customer, wherein the print customer is a user, for use in a variable information print job comprising:
    organizing the digital assets desired by the user into sub-groups of similar content;
    downloading a virtual layout template to a user site remote from a printing site;
    determining whether the desired digital assets satisfy specifications and rules for populating particular fields in the virtual layout template, the determining including:
        in response to receiving a user selection of a particular placeholder in the virtual layout template, comparing parameters of each of the desired digital assets in a sub-group against the specifications and rules defined for a particular field represented by the particular placeholder, and
        in response to receiving a user selection for a particular digital asset in the sub-group, determining if the particular digital asset complies with the specifications and rules designated for the particular field represented by the particular placeholder in the virtual layout template;
    in response to the determining, displaying the particular digital asset that is fully usable for the particular placeholder and placeholders that are fully usable with the particular digital asset,
    in response to one of the parameters of the each of the desired digital assets in the sub-group not complying with the specifications and rules defined for the particular field represented by the particular placeholder and the particular digital asset not complying with the specifications and rules for the particular field represented by the particular placeholder, advising the user of an incompatibility of the particular digital asset with a variable data field;
    in response to the displaying and advising, receiving a selection of the usable digital asset from the sub-group and placing the selected usable digital asset onto the virtual layout template at the user site; and
    uploading the selected usable digital asset to the printing site.

2. The method defined in claim 1, wherein the downloading a virtual layout template includes encoding one of selection-limiting parameters and rules in the template.

3. The method defined in claim 2, wherein the encoding includes displaying the selection-limiting parameters to the user.

4. The method defined in claim 1, wherein the uploading includes placing the selected usable digital asset in a virtual folder.

5. The method defined in claim 1, wherein the organizing into sub-groups includes organizing separate sub-groups for images, graphics and text.

6. The method defined in claim 1, wherein the selecting includes selecting variable images and text.

7. The method defined in claim 1, wherein the organizing includes sorting by hierarchy.

8. The method defined in claim 1, wherein the downloading a virtual layout template includes providing selection-limiting parameters in the virtual layout template; and, the step of placing includes complying with the selection-limiting parameters.

9. The method defined in claim 8 including encoding for displaying a fault condition when selecting digital assets fails to meet the selection-limiting parameters.

10. The method defined in claim 8, wherein the providing includes displaying to the user selected modifications of the digital assets relative to the virtual layout template.

11. The method defined in claim 10 wherein the selected modifications include identifying when a different selection is required for complying with the selection-limiting parameters.

12. The method defined in claim 1, wherein the downloading a virtual layout template includes providing user access to a display of selection-limiting parameters.

13. The method defined in claim 1, wherein the downloading a virtual layout template includes providing access to the user with an indication of an acceptable placement/location of any selected asset.

14. The method defined in claim 1, wherein the placing the selected digital assets onto the virtual layout template includes cropping and modifying.

15. A system for pre-press checking and editing digital assets by a print customer, wherein the print customer is a user, for use in a variable information print job, the system comprising:

a processor supported on a server for organizing the digital assets desired by the user into sub-groups of similar content, the processor being adapted to:

downloading a virtual layout template to a user site remote from a printing site;

determining whether the desired digital assets satisfy specifications and rules for populating particular fields in the virtual layout template, the determining including:

in response to receiving a user selection of a particular placeholder in the virtual layout template, comparing parameters of each of the desired digital assets in a sub-group against the specifications and rules defined for a particular field represented by the particular placeholder, and in response to receiving a user selection for a particular digital asset in the sub-group, determining if the particular digital asset complies with the specifications and rules designated for the particular field represented by the particular placeholder in the virtual layout template;

in response to the determining, displaying the particular digital asset that is fully usable for the particular placeholder and placeholders that are fully usable with the particular digital asset, in response to one of the parameters of the each of the desired digital assets in the sub-group not complying with the specifications and rules defined for the particular field represented by the particular placeholder and the particular digital asset not complying with the specifications and rules for the particular field represented by the particular placeholder, advising the user of an incompatibility of the particular digital asset with a variable data field;

in response to the displaying and advising, receiving a selection of the usable digital asset from the sub-group and placing the selected usable digital asset onto the virtual layout template at the user site; and uploading the selected usable digital asset to the printing site.

* * * * *